United States Patent
Koerner

(10) Patent No.: US 11,214,149 B2
(45) Date of Patent: Jan. 4, 2022

(54) RAIL VEHICLE AND DRIVE SYSTEM FOR A RAIL VEHICLE

(71) Applicant: SIEMENS MOBILITY GMBH, Munich (DE)

(72) Inventor: Olaf Koerner, Nuremberg (DE)

(73) Assignee: Siemens Mobility GmbH, Munich (DE)

(*) Notice: Subject to any disclaimer, the term of this patent is extended or adjusted under 35 U.S.C. 154(b) by 0 days.

(21) Appl. No.: 16/401,321

(22) Filed: May 2, 2019

(65) Prior Publication Data
US 2019/0337390 A1   Nov. 7, 2019

(30) Foreign Application Priority Data
May 2, 2018   (EP) ..................... 18170391

(51) Int. Cl.
| B60L 15/20 | (2006.01) |
| B60L 3/00 | (2019.01) |
| B60L 7/14 | (2006.01) |
| B61C 3/00 | (2006.01) |

(52) U.S. Cl.
CPC .............. *B60L 3/0061* (2013.01); *B60L 7/14* (2013.01); *B61C 3/00* (2013.01); *B60L 2200/26* (2013.01); *B60L 2220/10* (2013.01); *B60L 2220/50* (2013.01)

(58) Field of Classification Search
CPC ............ B60L 2200/26; B60L 2220/10; B60L 2220/50; B60L 3/0061; B60L 50/00; B60L 7/14; B61C 3/00
See application file for complete search history.

(56) References Cited

U.S. PATENT DOCUMENTS

| 6,431,297 B1 | 8/2002 | Nakazawa | |
| 8,164,282 B2 | 4/2012 | Okamura | |
| 9,641,106 B2 | 5/2017 | Ota et al. | |
| 9,789,871 B1* | 10/2017 | Dlala | B60W 10/14 |
| 2008/0121136 A1* | 5/2008 | Mari | B61C 5/00 |
| | | | 105/35 |
| 2008/0148993 A1* | 6/2008 | Mack | B60L 9/00 |
| | | | 105/35 |
| 2009/0173555 A1* | 7/2009 | Okamura | H02M 3/1582 |
| | | | 180/65.22 |

(Continued)

FOREIGN PATENT DOCUMENTS

| CN | 102039899 A | 5/2011 |
| CN | 103770637 A | 5/2014 |

(Continued)

OTHER PUBLICATIONS

Qin, Juanlan: "Motors for Urban Rail Transit Vehicles", Southwest Jiaotong University Press, Jan. 31, 2015, pp. 168-175, ISBN 978-7-5643-3569-4—English abstract.

*Primary Examiner* — Muhammad S Islam
(74) *Attorney, Agent, or Firm* — Laurence A. Greenberg; Werner H. Stemer; Ralph E. Locher

(57) ABSTRACT

A drive system for a rail vehicle includes a plurality of drive motors. The drive motors include at least one permanent magnet motor and at least one asynchronous motor and/or at least one reluctance motor. A rail vehicle having wheelsets, each of which includes two oppositely disposed wheels and which are driven at least partially by the drive system, is also provided.

6 Claims, 2 Drawing Sheets

(56) References Cited

U.S. PATENT DOCUMENTS

2016/0325762 A1  11/2016  Koerner et al.
2019/0135309 A1   5/2019  Kooi

FOREIGN PATENT DOCUMENTS

| | | |
|---|---|---|
| CN | 104773085 A | 7/2015 |
| CN | 205075633 U | 3/2016 |
| CN | 105813916 A | 7/2016 |
| CN | 206156268 U | 5/2017 |
| EP | 1029732 A2 | 8/2000 |
| JP | 2005073314 A | 3/2005 |
| JP | 2018057077 A | 4/2018 |
| WO | 2007139045 A1 | 12/2007 |
| WO | 2008073353 A2 | 6/2008 |
| WO | 2017184366 A1 | 10/2017 |

\* cited by examiner

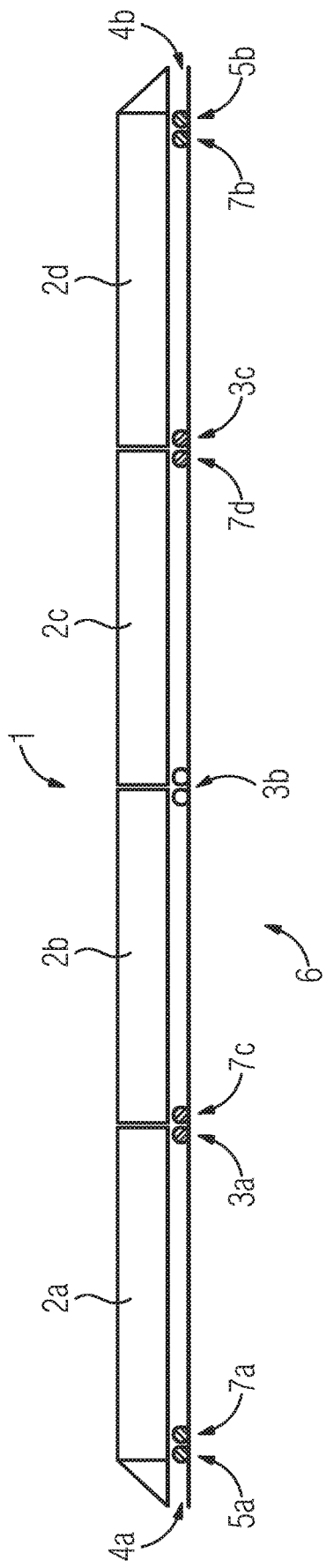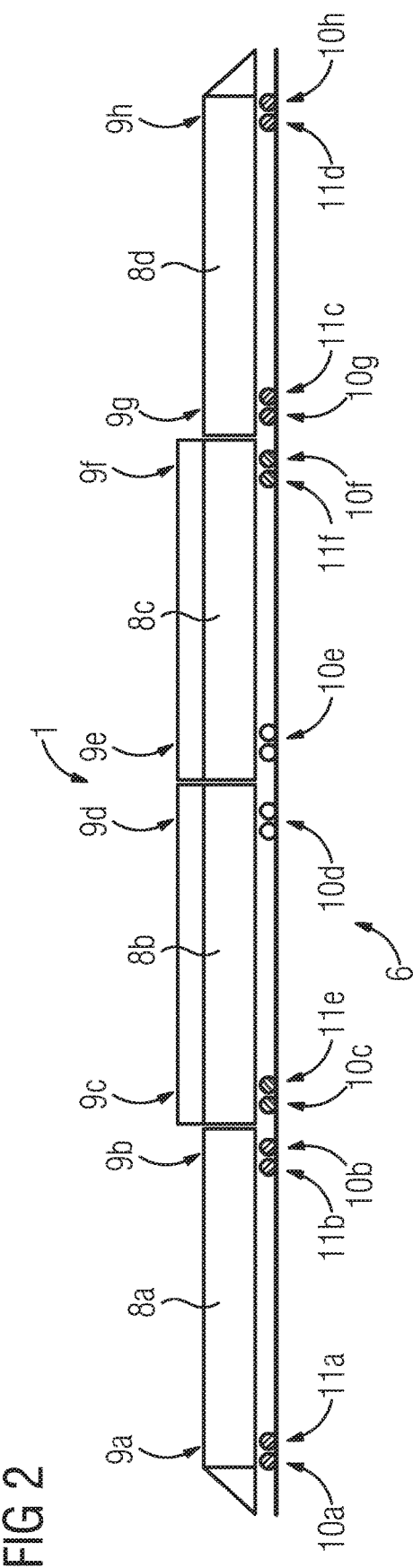

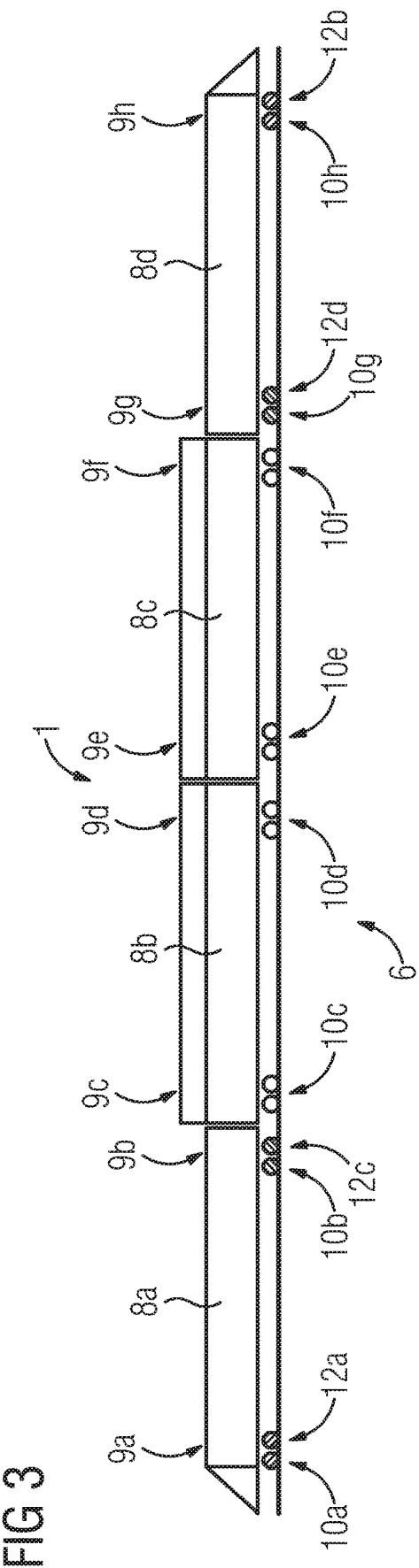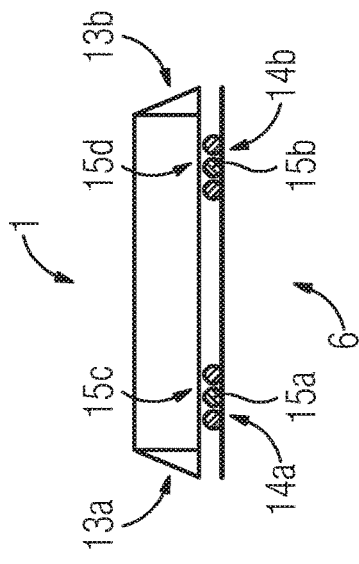

RAIL VEHICLE AND DRIVE SYSTEM FOR A RAIL VEHICLE

CROSS-REFERENCE TO RELATED APPLICATION

This application claims the priority, under 35 U.S.C. § 119, of European Patent Application EP 18 17 0391.9, filed May 2, 2018; the prior application is herewith incorporated by reference in its entirety.

BACKGROUND OF THE INVENTION

Field of the Invention

The invention relates to a drive system for a rail vehicle including a plurality of drive motors. The invention also relates to a rail vehicle having wheelsets, each of which includes two oppositely disposed wheels and which are driven at least partially by the drive system.

It is known to use permanent-magnet-excited traction motors (PM motors), synchronous reluctance machines or asynchronous machines in order to provide a drive for rail vehicles. PM traction motors are generally more energy-efficient than asynchronous machines because while both types of machine are subject to virtually identical stator losses there is an almost complete absence of rotor losses in the case of the PM traction motors. Conversely, the rotor losses account for around 25 to 30 percentage points of the overall losses of the asynchronous machines.

In the operation of rail vehicles, in particular in the case of commuter and regional passenger trains, movement phases between two stations are subdivided into four movement segments: acceleration, cruising, rolling/coasting, and braking.

The acceleration range is distinguished by a driving power of the rail vehicle and a transmission of the driving forces to the wheels of the rail vehicle. The rail vehicle accelerates as long as a tractive force of the drive of the rail vehicle is greater than a rolling resistance acting against it. The cruising segment is reached when tractive force and rolling resistance (more accurately: rolling resistance forces) are equivalent (with opposite signs).

In a rolling phase or in the coasting segment, the tractive force is stepped down to such an extent that the rail vehicle reduces its running speed due to the rolling resistance. If braking forces are applied in addition, the coasting segment transitions into the braking segment.

The interaction of the above-cited segments or phases of a movement of the rail vehicle is also referred to as an operational cycle.

In the operational cycles between the individual stations, the drive motor or motors operate at partial load or even experience driveless coasting phases during the cruising, rolling/coasting and braking phases. In such situations a period of operation ensues at 0 to 50 percentage points of the total driving power installed on the vehicle side over a relatively large proportion of the total traveling time between two stations. However, a high tractive force and driving power are required when moving out of the stations in the acceleration phase. That high tractive force and driving power determine the total number of driven wheelsets and the installed (short-term) driving power. Except for possible regenerative braking, however, that high driving power is no longer required during the remaining phases of the operational cycles.

When asynchronous machines are used as drive motors, individual drive motors, and consequently driven wheelsets, can be switched off by using clock inhibitions of individual power converters which supply the motors with electrical power. No further electromagnetic losses occur in the deactivated asynchronous machines in that case. At the same time the power converter clock inhibition also avoids losses in the power semiconductors being used (switching and conducting-state power losses in partial load operation). The remaining active drive motors are operated close to a peak load point, as a result of which higher levels of efficiency can be achieved.

A clock inhibition is not possible in the case of PM motors or at least does not lead to an electromagnetically lossless machine (in the case of a small number of stator windings with low induced open-circuit voltage and practically no field suppression), since the rotating permanent magnet flux continues to cause eddy current and hysteresis losses in the iron core used in the machine.

For reasons cited, a comparison of the energy consumption between asynchronous machines and PM motors in operational cycles with long rolling or coasting phases reveals that the PM motors are unable to achieve any energy saving or that they even result in a poorer energy balance. However, when exclusive use is made of asynchronous machines, the aforementioned losses occur in the rotors of the machines.

SUMMARY OF THE INVENTION

It is accordingly an object of the invention to provide a rail vehicle and a drive system for a rail vehicle, which overcome the hereinafore-mentioned disadvantages of the heretofore-known vehicles and systems of this general type and which exhibit a higher level of energy efficiency.

With the foregoing and other objects in view there is provided, in accordance with the invention, a drive system for a rail vehicle, comprising a plurality of drive motors, in which at least one permanent magnet motor and at least one asynchronous motor and/or at least one reluctance motor are provided as the drive motors.

The rail vehicle may, for example, be a commuter or regional passenger train or a passenger or freight locomotive.

When the rail vehicle that is to be driven is running in a partial load operation phase, the drive system according to the invention can advantageously shut down the asynchronous and/or reluctance motors, which experience more losses in this load range. In contrast to the asynchronous motor or the reluctance motor, the permanent magnet excitation also permits high levels of efficiency and power factors in lower performance ranges or can be operated at a high load (depending on the proportion of machine types and the required total drive capacity).

Thanks to the combination of permanent magnet motors with asynchronous motors and/or reluctance motors as drive motors, the asynchronous motors and/or reluctance motors can be switched on in addition to supplement the permanent magnet motors for handling peak load ranges during the acceleration phase in order to support a maximum tractive force and driving power.

The invention therefore enables the advantages of permanent magnet motors (high efficiency, including in partial load operation) to be combined with those of asynchronous motors and/or reluctance motors (easy loss-free shutdown capability) and a drive system to be provided that is efficient in terms of energy consumption.

Preferably, the plurality of drive motors of the drive system have substantially identical stator elements. For example, a six-pole traction motor stator can be provided for the drive motors, with the stator being combined accordingly in each case with a rotor associated with a permanent magnet motor, with a squirrel-cage rotor configured for an asynchronous motor or with a rotor for a reluctance motor. This enables a maintenance program to be configured for the drive system in a particularly simple and cost-effective manner.

If a permanently excited motor in combination with a reluctance motor embodied as a synchronous reluctance motor is provided for the drive system, a substantially identical power converter topology and drive control configuration can be used for controlling the two types of motor, which further simplifies the operation and the maintenance/servicing of the drive system. In this case a synchronous reluctance motor is a three-phase synchronous motor having a rotor which has either a so-called flux barrier cutout or salient poles.

With the objects of the invention in view, there is also provided a rail vehicle comprising wheelsets, each of which includes two oppositely disposed wheels and which are driven at least partially by the drive system as explained above.

In principle, any desired ratio between the permanent magnet motor(s) and the asynchronous motor(s) and/or the reluctance motor(s) is possible within the scope of the invention.

In an advantageous development of the rail vehicle, a number of wheelsets driven by a permanent magnet motor is twice as large as a number of wheelsets driven by an asynchronous motor and/or a reluctance motor.

A number of wheelsets driven by a permanent magnet motor that is exactly the same as a number of wheelsets driven by an asynchronous motor and/or a reluctance motor is particularly preferred. In other words, the number of wheelsets driven by a permanent magnet motor is identical to the number of wheelsets driven by an asynchronous motor and/or a reluctance motor.

Other features which are considered as characteristic for the invention are set forth in the appended claims.

Although the invention is illustrated and described herein as embodied in a rail vehicle and a drive system for a rail vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic, side-elevational view of an articulated urban-suburban train having Jacobs bogies;

FIG. 2 is a side-elevational view of a regional train having bilevel intermediate cars according to a first variant;

FIG. 3 is a side-elevational view of a regional train having bilevel intermediate cars according to a second variant; and FIG. 4 is a side-elevational view of a freight locomotive.

DETAILED DESCRIPTION OF THE INVENTION

Referring now to the figures of the drawings in detail and first, particularly, to FIG. 1 thereof, there is seen an articulated urban-suburban train 1 according to the invention including four train elements 2a, 2b, 2c, 2d. A first train element 2a and a second train element 2b (disposed adjacent thereto on the right in FIG. 1) are supported on a first common bogie 3a. The second train element 2b and a third train element 2c (disposed adjacent thereto on the right in FIG. 1) are supported on a second common bogie 3b. The third train element 2c and a fourth train element 2d (disposed adjacent thereto on the right in FIG. 1) are supported on a third common bogie 3c. The bogies 3a, 3b, 3c are also referred to as Jacobs bogies.

The first train element 2a (disposed on the extreme left in FIG. 1) is supported at a first front end 4a of the articulated train 1 on a first separate bogie 5a. The fourth train element 2d (disposed on the extreme right in FIG. 1) is supported at a second front end 4b of the articulated train 1 on a second separate bogie 5b. Each bogie 3a, 3b, 3c, 5a, 5b includes a pair of wheelsets. In this configuration, each wheelset includes two wheels disposed opposite one another which can be moved along on a rail track (as shown). Each bogie 3a, 3b, 3c, 5a, 5b accordingly includes four wheels. Bogies/undercarriages 3a, 3b, 3c, 5a, 5b, each of which has more or fewer wheels or wheelsets, may also be provided within the scope of the invention.

A drive system 6 of the articulated train 1 includes asynchronous motors and/or reluctance motors 7a, 7b which are respectively disposed in a region of the two separate bogies 5a, 5b of the first and fourth train element 2a, 2d and drive the associated wheels.

The drive system 6 of the articulated train 1 additionally includes permanent magnet motors 7c, 7d which are disposed in a region of the first common bogie 3a between the first train element 2a and the second train element 2b, and in a region of the third common bogie 3c between the third train element 2c and the fourth train element 2d. No drive motor is disposed in the second common bogie 3b.

FIG. 2 shows a first variant of a regional train 1 according to the invention including four cars 8a, 8b, 8c, 8d. The first car 8a (on the extreme left in FIG. 2) and the fourth car 8d represent conventional cars, while the second car 8b and the third car 8c, which are situated between the first car 8a and the fourth car 8d, are embodied as bilevel intermediate cars 8b, 8c. The second car 8b and the third car 8c can also be embodied as conventional cars (without a bilevel configuration).

All four cars 8a, 8b, 8c, 8d are supported in each case in their end sections 9a, 9b, 9c, 9d, 9e, 9f, 9g, 9h on a bogie 10a, 10b, 10c, 10d, 10e, 10f, 10g, 10h. Each bogie 10a, 10b, 10c, 10d, 10e, 10f, 10g, 10h includes a pair of wheelsets. In this configuration, each wheelset includes two wheels disposed opposite one another which can be moved along on a rail track (as shown). Each bogie 10a, 10b, 10c, 10d, 10e, 10f, 10g, 10h accordingly includes four wheels. Bogies/undercarriages 10a, 10b, 10c, 10d, 10e, 10f, 10g, 10h, each of which has more or fewer wheels or wheelsets, may also be provided within the scope of the invention.

A drive system 6 of the regional train 1 includes permanent magnet motors 11a, 11b, 11c, 11d which are disposed in a region of the bogies 10a, 10b, 10g, 10h of the first car 8a and of the fourth car 8d.

The drive system 6 of the regional train 1 furthermore includes asynchronous motors and/or reluctance motors 11e, 11f, which are disposed in an end section 9c (located on the left in FIG. 2) of the second car 8b and in an end section 9f (located on the right in FIG. 2) of the third car 8c in a region of the associated bogies 10c, 10f and drive the associated wheels.

No drive motor is disposed in an end section 9d (located on the right in FIG. 2) of the second car 8b and in an end section 9e (located on the left in FIG. 2) of the third car 8c in a region of the associated bogies 10d, 10e.

FIG. 3 shows a second variant of a regional train 1 according to the invention including four cars 8a, 8b, 8c, 8d. The first car 8a (on the extreme left in FIG. 2) and the fourth car 8d represent conventional cars, while the second car 8c and the third car 8c, which are situated between the first car 8a and the fourth car 8d, are embodied as bilevel intermediate cars 8b, 8c. The second car 8b and the third car 8c can also be embodied as conventional cars (without a bilevel configuration).

All four cars 8a, 8b, 8c, 8d are supported in each case in their end sections 9a, 9b, 9c, 9d, 9e, 9f, 9g, 9h on a bogie 10a, 10b, 10c, 10d, 10e, 10f, 10g, 10h. Each bogie 10a, 10b, 10c, 10d, 10e, 10f, 10g, 10h includes a pair of wheelsets. In this configuration, each wheelset includes two wheels disposed opposite one another which can be moved along on a rail track (as shown). Each bogie 10a, 10b, 10c, 10d, 10e, 10f, 10g, 10h accordingly includes four wheels. Bogies/undercarriages 10a, 10b, 10c, 10d, 10e, 10f, 10g, 10h, each of which has more or fewer wheels or wheelsets, may also be provided within the scope of the invention.

A drive system 6 of the regional train 1 includes permanent magnet motors 12a, 12b which are disposed in a region of the bogie 10a (located on the left in FIG. 3) of the first car 8a and in a region of the bogie 10h (located on the right in FIG. 3) of the fourth car 8d.

The drive system 6 of the regional train 1 furthermore includes asynchronous motors and/or reluctance motors 12c, 12d, which are disposed in an end section 9b (located on the right in FIG. 2) of the first car 8a and in an end section 9g (located on the left in FIG. 2) of the fourth car 8d in a region of the associated bogies 10b, 10g and drive the associated wheels.

The second car 8b and the third car 8c have no drive motors.

FIG. 4 shows a freight locomotive 1 according to the invention. The freight locomotive 1 is supported at a first front end 13a on a first bogie 14a. The freight locomotive 1 is supported at a second front end 13b on a second bogie 14b.

Each bogie 14a, 14b includes three wheelsets. In this configuration, each wheelset includes two wheels disposed opposite one another which can be moved along on a rail track (as shown). Each bogie 14a, 14b accordingly includes six wheels. Bogies 14a, 14b, each of which has more or fewer wheels or wheelsets, may also be provided within the scope of the invention.

A drive system 6 of the freight locomotive 1 includes asynchronous motors and/or reluctance motors 15a, 15b, each of which drives a middle wheelset of the two bogies 14a, 14b.

The drive system 6 of the freight locomotive 1 furthermore includes permanent magnet motors 15c, 15d which drive the remaining wheelsets of the two bogies 14a, 14b.

Although the invention has been illustrated and described in greater detail on the basis of the preferred exemplary embodiment, the invention is not limited by the disclosed examples and other variations may be derived therefrom by a person skilled in the art without leaving the scope of protection of the invention.

The invention claimed is:

1. A drive system for a rail vehicle, the drive system comprising:
   a plurality of drive motors;
   said plurality of drive motors including at least one permanent magnet motor; and
   said plurality of drive motors including at least one additional motor selected from the group consisting of an asynchronous motor and a reluctance motor
   the drive system configured for shutting down said at least one additional motor while also operating said at least one permanent magnet motor when the rail vehicle is running in a partial load operation phase; and
   the drive system configured for switching on said at least one additional motor and said at least one permanent magnet motor when the rail vehicle requires a high tractive force compared to the partial load operation phase or is in peak load during an acceleration phase of the rail vehicle.

2. The drive system according to claim 1, wherein said plurality of drive motors have substantially identical stator elements.

3. The drive system according to claim 1, wherein said at least one additional motor is said reluctance motor, and wherein said reluctance motor is constructed as a synchronous reluctance motor.

4. A rail vehicle, comprising:
   wheelsets each including two respective oppositely disposed wheels; and
   a drive system according to claim 1 at least partially driving said wheelsets.

5. The rail vehicle according to claim 4, wherein said wheelsets include:
   a number of first wheelsets driven by one or more permanent magnet motors; and
   a number of second wheelsets driven by one or more of at least one of asynchronous motors or reluctance motors;
   said number of first wheelsets being twice as large as said number of second wheelsets.

6. The rail vehicle according to claim 4, wherein said wheelsets include:
   a number of first wheelsets driven by one or more permanent magnet motors; and
   a number of second wheelsets driven by one or more of at least one of asynchronous motors or reluctance motors;
   said number of first wheelsets being identical to said number of second wheelsets.

* * * * *